United States Patent [19]

Prakken

[11] Patent Number: 4,697,452
[45] Date of Patent: Oct. 6, 1987

[54] APPARATUS FOR TESTING THE LEAKTIGHTNESS OF FILLED, CLOSED PACKAGES OF FLEXIBLE MATERIAL

[76] Inventor: Bouwe Prakken, Spijkerlaan 9, 3471 Eg Kamerik, Netherlands

[21] Appl. No.: 855,737

[22] Filed: Apr. 25, 1986

[30] Foreign Application Priority Data

May 9, 1985 [NL] Netherlands ............ 8501336

[51] Int. Cl.⁴ ............................................ G01M 3/00
[52] U.S. Cl. ........................................ 73/49.3; 73/52
[58] Field of Search ............... 73/49.3, 49.2, 52, 45.4; 209/599, 600

[56] References Cited

U.S. PATENT DOCUMENTS

| | | | |
|---|---|---|---|
| 3,918,293 | 11/1975 | Feigel | 73/49.3 |
| 4,024,956 | 5/1975 | Cassidy | 73/49.3 |
| 4,148,213 | 4/1979 | Prakken | 73/45.4 |
| 4,510,730 | 4/1985 | Edmondson | 73/49.3 |
| 4,517,827 | 5/1985 | Tapscott | 73/49.3 |

FOREIGN PATENT DOCUMENTS 137662 4/1985 European Pat. Off. .

Primary Examiner—Stewart J. Levy
Assistant Examiner—Hezron E. Williams
Attorney, Agent, or Firm—Watson, Cole, Grindle & Watson

[57] ABSTRACT

For testing filled closed packages of flexible material for leaktightness use is made of an apparatus provided with conveyor means (2) for feeding packages in line and with means for applying pressure to the packages. The last-mentioned means consist of two pressure belts (4, 5) disposed a short distance apart. In the gap (6) between the pressure belts (4, 5) is situated a pivoting arm (8) or a shoe (20) having a pressure chamber (21), whereby it can be determined whether the portion of the package lying in the gap between the pressure belts is taut. This apparatus is in particular suitable for testing bags having two curved surfaces which are joined together by three or four sealing seams.

9 Claims, 4 Drawing Figures

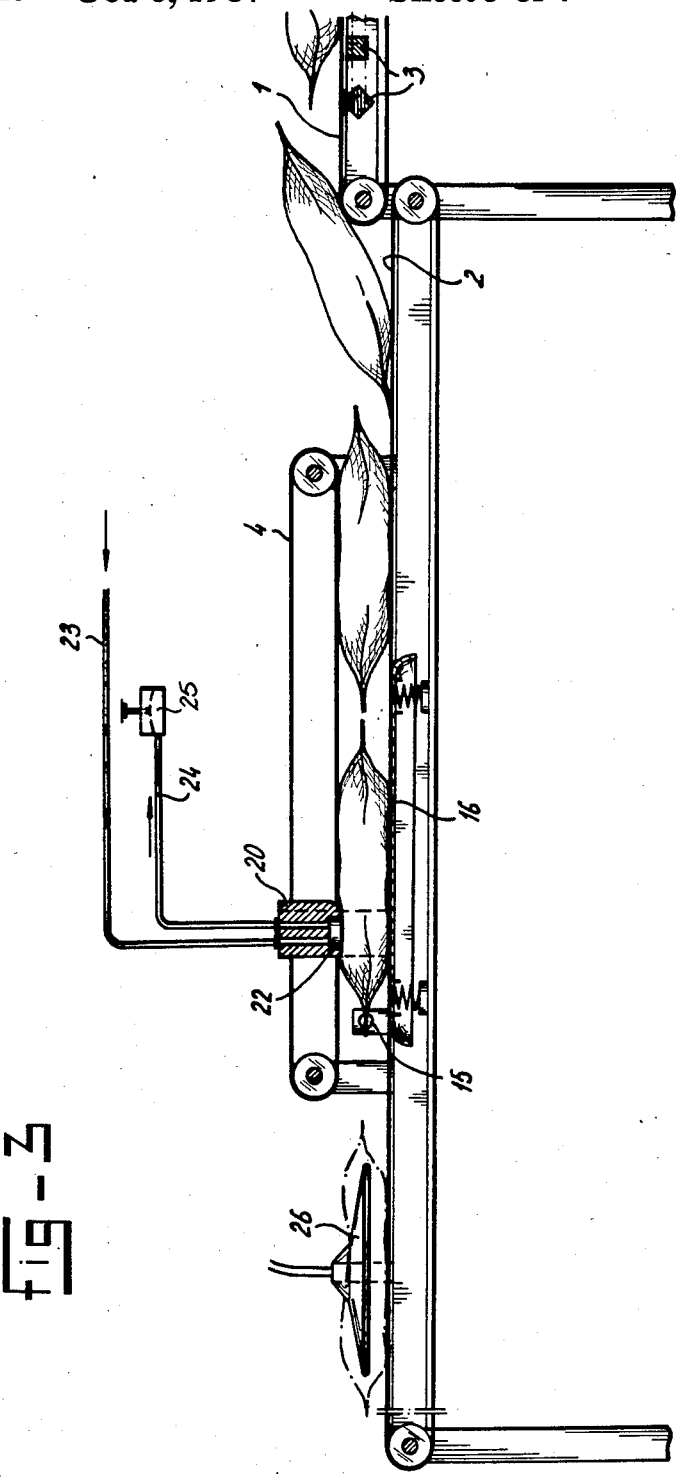

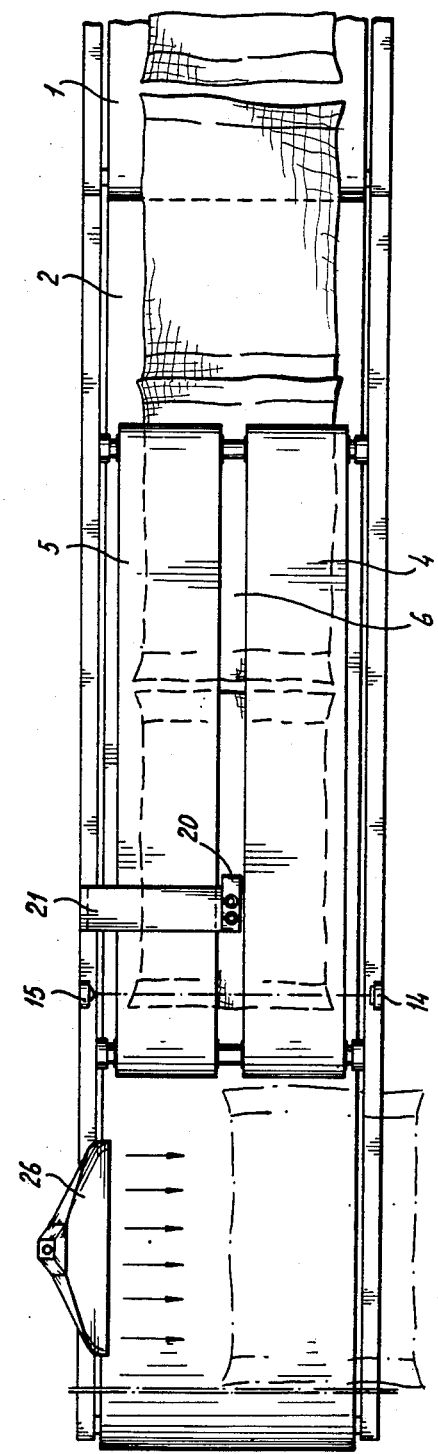

APPARATUS FOR TESTING THE LEAKTIGHTNESS OF FILLED, CLOSED PACKAGES OF FLEXIBLE MATERIAL

BACKGROUND OF THE INVENTION

The invention relates to an apparatus for testing the leaktightness of filled, closed packages of flexible material, comprising conveyor means for feeding the packages in line, means for applying pressure to the packages while they are being conveyed, whereby packages free from leaks are locally expanded by the pressure and leaking packages are subjected by the pressure to expansion either not at all or to a far lesser extent, and means for determining the amount of the local expansion.

An apparatus of this kind is known from U.S. Pat. No. 4,024,956. This known apparatus is particularly intended for testing packets of cigarettes. The conveyor means consist of two conveyor belts acting on the sides of the packets and causing the latter to slide over a fixed support. The means applying pressure to the packets consist of adjustable brackets which press the conveyor belts against the sides of the packets, and of pressure rollers which act on the top face of the packets. These rollers are intended to force air out of any leaking packets. The pivoting arm is disposed downstream of the pressure rollers, referring to the direction in which the packets are conveyed. At the moment when the pivoting arm acts on the packets, the latter are compressed only by the side conveyors. An apparatus of this kind would be unsuitable for testing bags having two curved faces which are joined together by three or four sealing seams. Bags of this kind are usually employed for packing potato crisps, salted crackers, and the like. A pivoting arm acting on a sealing seam would have little effect. With bags of this kind, perfect testing for leaks makes it necessary for the bags to be compressed over a large area and for the pivoting arm to act on a small part of one of the two faces, this part being held taut when there are no leaks.

SUMMARY OF THE INVENTION

The present invention provides a solution to this problem. According to the invention the apparatus first mentioned above is for this purpose characterized in that the means for applying pressure to the packages consist of at least two pressure belts disposed a short distance apart, and that the means for determining the amount of the local expansion are disposed in the gap between the two pressure belts.

The bags will as a rule be fed on a horizontal conveyor belt and the two pressure belts will be situated above the conveyor belt. This is however not essential. The conveyor belt and the pressure belts could be disposed vertically or obliquely.

The most important advantage of the invention is that the means for determining the amount of the expansion act on a relatively small part of the surface of the bags which is not in contact with the two pressure belts and therefore is held taut if the bag has no leaks. The accuracy of leak detection is thereby greatly improved.

These means for determining the amount of the local expansion may consist of a pivoting arm. The position of the latter can be determined in different ways, for example with the aid of microswitches. For the sake of simplicity, however, it is preferable for the pivoting arm itself to be provided with a vane which interrupts the beam transmitted to a photocell when the pivoting arm acts on a leaktight bag.

The pivoting arm may be straight but is preferably V-shaped.

A fixed shoe having a chamber which is open at the bottom and into which a compressed air pipe and a pressure pickup pipe leading to a pressure transducer lead is more accurate than a pivoting arm. This chamber is so situated that the part of a leaktight bag which is held taut can extend along the opening of the chamber and can close the latter, whereby the pressure can be momentarily increased and this increase be detected by the pressure transducer.

The pressure transducer preferably consists of a diaphragm switch.

It will generally be necessary for the means for determining the amount of the local expansion (pivoting arm or shoe) to come into action only if a bag has reached a determined position in or on the conveyor belt. Means will therefore be provided to signal that a bag being fed has reached a determined position on the conveyor belt, whereupon the means for determining the amount of local expansion can be put into action.

For satisfactory testing it is important that the filling in the packing (for example potato crisps) should not lie all in one heap but should be spread over the volume of the packing. It is therefore preferable to add a vibrating device to the apparatus. This device will for example consist of rotationally drivable rods of non-circular section disposed under a flexible conveyor surface.

The invention will now be explained in greater detail with the aid of diagrammatical drawings, in which two embodiments are shown.

DESCRIPTION OF THE DRAWINGS

FIG. 3 is a side view of a second embodiment of apparatus according to the present invention embodiment.

FIG. 4 is a top plan view of the apparatus shown in FIG. 3.

DETAILED DESCRIPTION OF THE PREFERRED EMBODIMENTS

Figure 1:
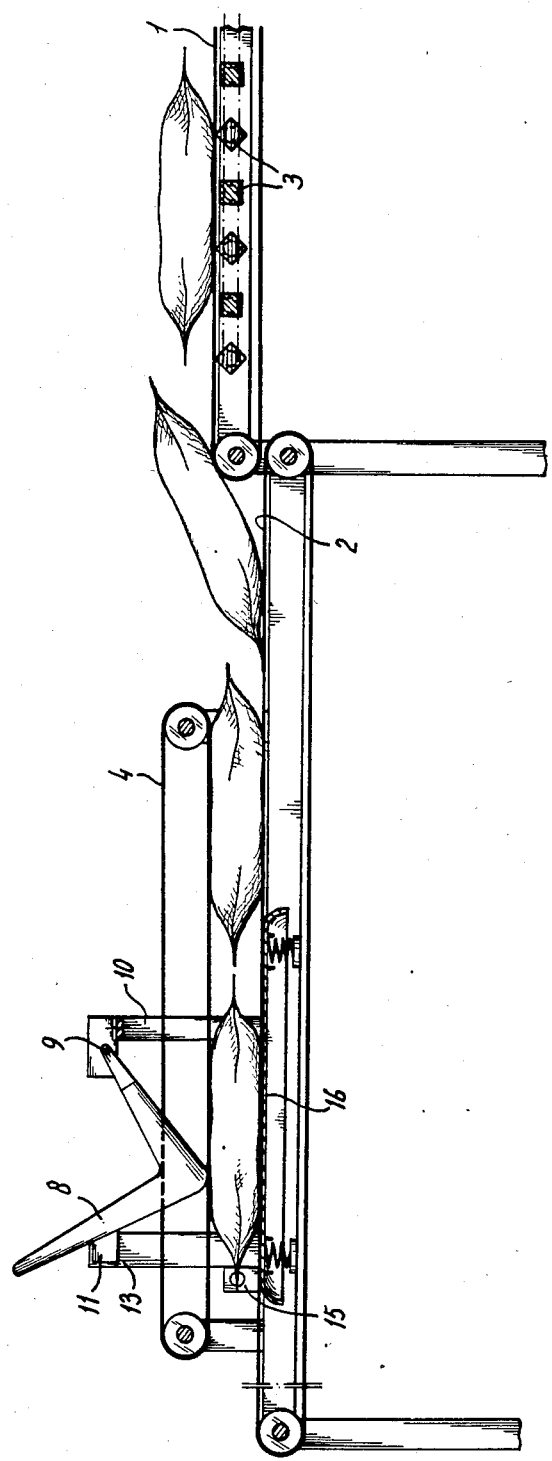
FIG. 1 is a side view of a first embodiment of the inventive apparatus.
Figure 2:
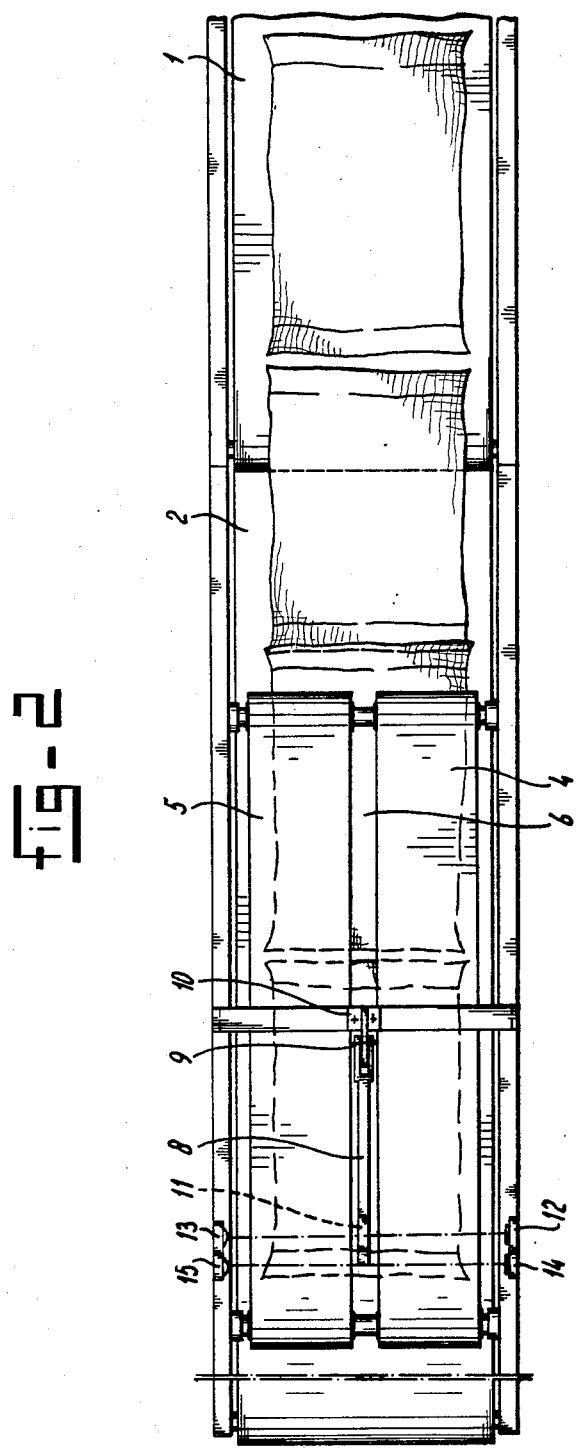
FIG. 2 is a top plan view of the apparatus shown in FIG. 1.

The apparatus shown in FIGS. 1 and 2, intended for testing the leaktightness of filled, closed bags of flexible material, for example bags of potato crisps, comprises conveyor means for feeding the bags, these means being in the form of two horizontal conveyor belts 1, 2 following one another.

Under the conveying surface of the conveyor belt 1 are disposed a number of non-circular rods 3, which during operation are rotated in order to vibrate the bags lying on the conveying surface and thus to allow the product to spread out in the bags.

Above the conveying surface of the conveyor belt 2 are disposed two pressure belts 4, 5, between which a gap 6 is left free.

A V-shaped arm 8 is pivotably fastened at 9 on a pillar 10 so that it can move inside the gap 6. A vane 11 is fastened on the arm 8 and can interrupt the light beam between a light source 12 and a photocell 13.

A light source 14 transmitting a beam to a photocell 15 is also disposed a short distance above the conveyor belt 2.

A spring-loaded pressure plate 16 is disposed under the conveying surface of the conveyor belt 2.

The apparatus works as follows:

The bags filled with product are fed in line by the conveyor belt 1 to the conveyor belt 2, while the product is spread out in the bags by the rotating non-circular rods 3. The bags arrive between the conveyor belts 2, 4 and 5 and are compressed, whereby parts of the bags which do not come into contact with the surfaces of the belts are stretched taut if the bags have no leaks. One of these parts is the portion of the bags which is situated at the gap 6 between the conveyor belts 4 and 5.

The pivoting arm 8 is moved upwards by each bag against the action of the weight of the arm (or of a spring). As soon as the front edge of a bag interrupts the light beam between the light source 14 and the photocell 15, a signal is transmitted to the photocell 13 to come into action. In the case of a bag which has no leaks, the vane will interrupt the light beam, while in the case of a leaking bag the vane will be under the light beam and the photocell acted on by the light beam will transmit a signal to an alarm system or to means for removing the leaking bag.

In FIGS. 3 and 4 the same components are given corresponding reference numerals. The apparatus shown in FIGS. 3 and 4 differs from that shown in FIGS. 1 and 2 only in that instead of the V-shaped arm a fixed shoe 20 is disposed in the gap 6 with the aid of a fastening means 21. This shoe 20 is provided with a chamber 22 open at the bottom and into which two pipes lead: a compressed air pipe 23 for supplying compressed air under elevated pressure (about 0.5 bar) to the chamber, and a pipe 24 which is connected to a pressure transducer 25 in the form of a diaphragm switch. The chamber 22 is in such a position relative to the lower face of the belts 4 and 5 that a leakproof bag can extend with its taut portion along the opening of the chamber 22 and can close the opening. The pressure in the chamber will thus be increased for a short time, and this will be detected by the pressure transducer 25. If the front edge of a bag interrupts the light beam between the light source 14 and the photocell 15, a signal is transmitted to the pressure transducer 25 to effect a measurement of pressure during a determined period of time. If the pressure during that period of time is sufficiently high, the bag has no leaks and can pass through. If the pressure is too low in the chamber, the pressure transducer will transmit a signal to an ejector, for example in the form of a blast nozzle 26, which will blow the bag off the belt 2. The embodiment provided with the fixed shoe works more accurately than the embodiment using the V-shaped arm, and in addition is less sensitive to uneven distribution of the product in the bags.

It is essential to the invention that a large part of the surface of the bags being tested should be in contact with the belts 2, 4 and 5, and that the pivoting arm, or the chamber 21 as the case may be, should be able to come into contact with the compressed bags via a narrow gap between the belts 4 and 5. The part held taut in this gap but not protruding, or only slightly protruding, gives an accurate indication that the bags have no leaks, while in the case of a leaking bag the pivoting arm 8, or the chamber 21 as the case may be, will be in contact with a part of the surface which is not taut.

Various modifications and additions are possible within the scope of the invention.

What is claimed is:

1. An apparatus for moving a series of filled and closed packages which are made of a flexible material along a path and for detecting whether there are leaks in any of the packages, said apparatus comprising:
   a conveyor means for supporting said series of filled and closed packages and moving them along a path,
   first and second pressure belts which are positioned to simultaneously press at least one of said packages towards and against said conveyor means as said packages are moved by said conveyor means along said path, said first and second pressure belts being spaced apart to provide a gap therebetween, and
   first sensing means located in said gap to determine the degree of expansion of each package which is compressed by said first and second pressure belts and thus detect whether any of said packages have leaks therein.

2. The apparatus according to claim 1, wherein said conveyor means generally extends in a first plane, wherein said first and second pressure belts generally extend in a common second plane, and wherein said first and second planes are generally parallel.

3. The apparatus according to claim 1, wherein said first sensing means includes an arm that is pivotally mounted so as to be capable of contacting each of said packages moving along said conveyor means, and a vane connected to said arm, said vane being capable of interrupting a light beam directed to a photocell.

4. The apparatus according to claim 3, wherein said arm is V-shaped.

5. The apparatus according to claim 1, wherein said first sensing means includes a shoe which is fixedly mounted, said shoe having a chamber which is open towards said conveyor means and which can contact each of said packages moving along said conveyor means, a first pipe connected to said shoe to supply compressed air to said chamber, a second pipe connected to said shoe to sense the air pressure within said chamber, and a pressure transducer connected to said second pipe.

6. The apparatus according to claim 5, wherein said pressure transducer comprises a diaphragm switch.

7. The apparatus according to claim 1, including second sensing means for sensing when each said package has reached a predetermined position along said path.

8. The apparatus according to claim 1, including vibration means to vibrate each of said packages.

9. The apparatus according to claim 8, including a feed belt for depositing said series of packages on said conveyor belt, and wherein said vibration means comprises a plurality of rotatable rods located on the side of said feed belt opposite the side which contacts said packages, each of said rotatable rods having a non-circular cross section and being located so as to contact the adjacent side of said feed belt.

* * * * *